US007534059B2

United States Patent
Nishizawa

(10) Patent No.: US 7,534,059 B2
(45) Date of Patent: May 19, 2009

(54) IMAGING APPARATUS AND METHOD FOR MANUFACTURING THE SAME

(75) Inventor: Hiroshi Nishizawa, Yokohama (JP)

(73) Assignee: Panasonic Corporation, Osaka (JP)

( * ) Notice: Subject to any disclaimer, the term of this patent is extended or adjusted under 35 U.S.C. 154(b) by 464 days.

(21) Appl. No.: 10/558,944

(22) PCT Filed: May 26, 2004

(86) PCT No.: PCT/JP2004/007582

§ 371 (c)(1),
(2), (4) Date: Nov. 30, 2005

(87) PCT Pub. No.: WO2004/107738

PCT Pub. Date: Dec. 9, 2004

(65) Prior Publication Data

US 2007/0030334 A1 Feb. 8, 2007

(30) Foreign Application Priority Data

| May 30, 2003 | (JP) | ............... 2003-155348 |
| Sep. 8, 2003 | (JP) | ............... 2003-315545 |

(51) Int. Cl.
*G03D 17/00* (2006.01)
(52) U.S. Cl. ..................................... 396/529
(58) Field of Classification Search ............... 396/259, 396/529, 507, 513, 530, 542; 348/147; 356/614, 356/626; 257/E31.117, E31.118, 432; 359/514, 359/237, 248

See application file for complete search history.

(56) References Cited

U.S. PATENT DOCUMENTS

| 5,302,778 A | 4/1994 | Maurinus |
| 5,838,495 A | 11/1998 | Hennick |

(Continued)

FOREIGN PATENT DOCUMENTS

EP    1 289 281 A1    3/2003

(Continued)

*Primary Examiner*—Reena Aurora
(74) *Attorney, Agent, or Firm*—Hamre, Schumann, Mueller & Larson, P.C.

(57) ABSTRACT

An imaging apparatus includes: a three-dimensional substrate in which a partition wall (11) having an opening (10*a*) at a central portion is formed so as to cross an inner cavity; an optical filter (5) that is fixed on a first flat surface (12) of both surfaces of the partition wall so as to cover the opening; a semiconductor imaging device (4) that is face-down mounted on a second flat surface (13) of the partition wall with an imaging area (4*a*) facing the opening; and an optical system for forming images that is installed on a side of the optical filter in the inner cavity of the three-dimensional substrate. The opening of the partition wall is closed on both sides with the optical filter and the semiconductor imaging device so as to form a cavity. An air passage (12*a*) for allowing communication between the cavity and an exterior of the three-dimensional substrate is formed on the first flat surface, and has a labyrinth structure that causes a flow rate of air passing through the air passage to vary depending on a location in the air passage. This allows air circulation between the exterior and a cavity enclosed by a semiconductor imaging device and an optical filter, while suppressing the entry of foreign matter from the exterior into the cavity via an airflow caused by expansion/contraction of air.

7 Claims, 7 Drawing Sheets

U.S. PATENT DOCUMENTS

| | | |
|---|---|---|
| 6,428,650 B1 | 8/2002 | Chung |
| 2003/0094665 A1 | 5/2003 | Harazono |

FOREIGN PATENT DOCUMENTS

| | | |
|---|---|---|
| JP | 2001-245186 | 9/2001 |
| JP | 2003-92394 | 3/2003 |

IMAGING APPARATUS AND METHOD FOR MANUFACTURING THE SAME

TECHNICAL FIELD

The present invention relates to an imaging apparatus using a semiconductor imaging device, which is reduced in size and thickness and used mainly in a camera mounted in portable equipment or the like, and a method for manufacturing the same.

BACKGROUND ART

Conventional imaging apparatuses of this kind have a structure described in JP2001-245186 A, for example. In the structure, a semiconductor imaging device configured of a CCD (Charge Coupled Device) or the like is mounted with a lens on a three-dimensional substrate and converts a focused image formed by the lens into an electric signal so that the image can be output.

The three-dimensional substrate is composed of a base part having a rectangular planar shape and a cylindrical barrel part disposed on an upper portion of the base part, and an opening is formed on a boundary between the base part and the barrel part. The lens is fitted against an inner peripheral surface of the barrel part. With an optical axis of the lens being the center, an optical filter is disposed on an upper side of the opening, and the semiconductor imaging device is disposed on a lower side of the opening.

According to the requirement for a size reduction and a higher performance of portable equipment mounting imaging apparatuses, there has been an increasing demand that the imaging apparatuses themselves be reduced in size and weight. In order to meet this demand, it has been the case that the thickness of each of the above-described components is reduced to the maximum extent, thereby realizing the thickness reduction of imaging apparatuses.

Such a conventional imaging apparatus provides a reduced margin of strength due to the thickness reduction of each constituent component. Because of this, in a heating process for bonding or joining, the flatness of a surface of a three-dimensional substrate on which a semiconductor imaging device is mounted is likely to be deteriorated due to anisotropy in thermal expansion of the substrate and heat distortion caused in the substrate.

Furthermore, semiconductor imaging devices also should be reduced in thickness, and this has been met by so-called back grinding in which a semiconductor wafer is ground from a back surface thereof with, for example, a grinder using a diamond grindstone or the like. Because of this, the mechanical strength of a semiconductor imaging device itself is decreased compared with a conventional case, and the strength of a three-dimensional substrate on which the semiconductor imaging device is mounted also is decreased, so that it is more likely that the semiconductor imaging device and the three-dimensional substrate are warped due to heat and a load applied at the time of mounting.

As described above, thickness reduction leads to an increase in the occurrence of a failure in a process, which causes a cost increase, and requires an inspection process, which increases the number of processes. This has been a hindrance to the thickness reduction of imaging apparatuses. Particularly, with respect to the following problems that are attributable to an entire module being heated/cooled in a bonding or sealing process for fabricating an imaging apparatus, thickness reduction exerts a greater influence on the performance of the imaging apparatus.

That is, when an entire module is heated/cooled, expansion/contraction of air is caused in a cavity enclosed by a semiconductor imaging device and an optical filter that are installed on a three-dimensional substrate. If there is no air circulation from and to the exterior at this time, an internal pressure in the cavity increases and may cause the optical filter to be broken. In order to avoid this, conventionally, an air purging hole is provided so as to communicate with the cavity.

However, with the air purging hole communicating with the cavity, foreign matter may enter the cavity from the exterior via an airflow caused by the expansion/contraction of air. Further, this configuration requires an operation of closing the hole after a bonding or sealing process, and, therefore, foreign matter generated by a material used to close the hole or foreign matter produced in the closing operation may enter into the inside of the module to cause a flaw in an image.

DISCLOSURE OF INVENTION

In order to solve the above-mentioned conventional problems, it is an object of the present invention to provide an imaging apparatus that achieves thickness reduction and an improvement in workability, and allows air circulation between the exterior and a cavity enclosed by a semiconductor imaging device and an optical filter, while suppressing the entry of foreign matter from the exterior into the cavity via an airflow caused by expansion/contraction of air.

An imaging apparatus according to the present invention includes: a three-dimensional substrate in which a partition wall having an opening at a central portion is formed so as to cross an inner cavity; an optical filter that is fixed on a first flat surface of both surfaces of the partition wall so as to cover the opening; a semiconductor imaging device that is face-down mounted on a second flat surface of the partition wall with an imaging area facing the opening; and an optical system for forming images that is installed on a side of the optical filter in the inner cavity of the three-dimensional substrate. The opening of the partition wall is closed on both sides with the optical filter and the semiconductor imaging device so as to form a cavity. In order to solve the above-mentioned problems, an air passage for allowing communication between the cavity and an exterior of the three-dimensional substrate is formed on the first flat surface, and has a labyrinth structure that causes a flow rate of air passing through the air passage to vary depending on a location in the air passage.

According to this configuration, for example, in a heating process for fabricating an imaging apparatus, when gas (air) existing in a cavity expands/contracts, air circulation is performed only through a passage having a non-linear structure, and thus the entry of foreign matter from the exterior can be prevented reliably. This can prevent a phenomenon in which foreign matter entering from the exterior causes a so-called flaw in an image that deteriorates the image, and thus can reduce the occurrence of a failure in a process resulting from thickness reduction.

The labyrinth structure of the air passage can be defined by a zigzag shape, a shape inclined as a whole or a circular-arc shape.

Furthermore, the labyrinth structure of the air passage may be formed by providing a rib crossing the air passage so that a height of the air passage in a thickness direction of the optical filter varies along a flow direction of the air passage. According to this configuration, a gap formed between an optical filter and a labyrinth structure varies in cross-sectional area along an air passage. Thus, it is possible to cause a flow rate of air passing through the air passage to vary with the height of the gap.

Furthermore, the labyrinth structure of the air passage may be formed by providing a concave part on a side edge of the air passage so that a width of the air passage within the first flat surface varies along the flow direction of the air passage. According to this configuration, a gap formed between an optical filter and a labyrinth structure varies in cross-sectional area along an air passage. Thus, it is possible to cause a flow rate of air passing through the air passage to vary with the width of the gap.

Preferably, the three-dimensional substrate has such a low light transmittance with respect to a region sensitive to light reception by the semiconductor imaging device that substantially no unwanted signal is generated. According to this configuration, with regard to the achievement of higher sensitivity of semiconductor imaging devices that is pursued along with the size reduction of imaging apparatuses, an influence of disturbance light can be reduced in an imaging apparatus, thus suppressing a functional deterioration of the imaging apparatus when used in portable equipment that is used outdoors frequently. Moreover, even when the imaging apparatus is used in so-called skeleton type portable equipment, which is future portable equipment that itself has a translucent housing, the entry of light entering from the periphery can be prevented reliably, making it possible to prevent a deterioration of an image with reliability.

Furthermore, preferably, the air passages are located at a position axisymmetric with respect to the opening in the three-dimensional substrate. According to this configuration, anisotropy caused at the time of heating after a transparent plate is bonded to a three-dimensional substrate can be reduced, and thus it is possible to prevent a decrease in the flatness of a flat surface on which a semiconductor imaging device is mounted. This facilitates the thickness reduction of imaging apparatuses.

A method for manufacturing an imaging apparatus according to the present invention uses a three-dimensional substrate in which a partition wall having an opening at a central portion is formed so as to cross an inner cavity, an air passage with a non-linear structure for allowing communication between the opening and an exterior of the three-dimensional substrate is formed on a first flat surface of both surfaces of the partition wall, and a conductor land for connection is provided on a second flat surface of the partition wall. The method includes process steps of fixing an optical filter on the first flat surface by bonding; installing a semiconductor imaging device with respect to the conductor land for connection provided on the second flat surface; sealing the semiconductor imaging device; and subsequently installing an optical system for forming images in the inner cavity of the three-dimensional substrate.

According to this manufacturing method, since an optical filter is fixed by bonding with respect to a three-dimensional substrate, the mechanical strength of the three-dimensional substrate is increased, and thus, in a later process, it becomes easier to secure the accuracy of, for example, a required flatness at the time of mounting a semiconductor imaging device. Moreover, by subsequently sealing the semiconductor imaging device, the entry of foreign matter into a cavity between the semiconductor imaging device and the optical filter can be prevented reliably. This prevents a phenomenon in which foreign matter in an imaging apparatus causes a flaw, thereby facilitating the size and thickness reduction of imaging apparatuses.

DESCRIPTION OF THE INVENTION

In the imaging apparatus according to the present invention, the opening of the three-dimensional substrate is enclosed with the optical filter and the semiconductor imaging device so as to form a cavity, and the air passage for allowing the cavity to communicate with the exterior has the labyrinth structure that causes a flow rate of air passing through the air passage to vary depending on a location in the air passage. Thus, for example, in a process of fabricating an imaging apparatus, the entry of foreign matter into a module can be prevented, thereby facilitating thickness reduction and improving workability in fabrication.

Figure 1:
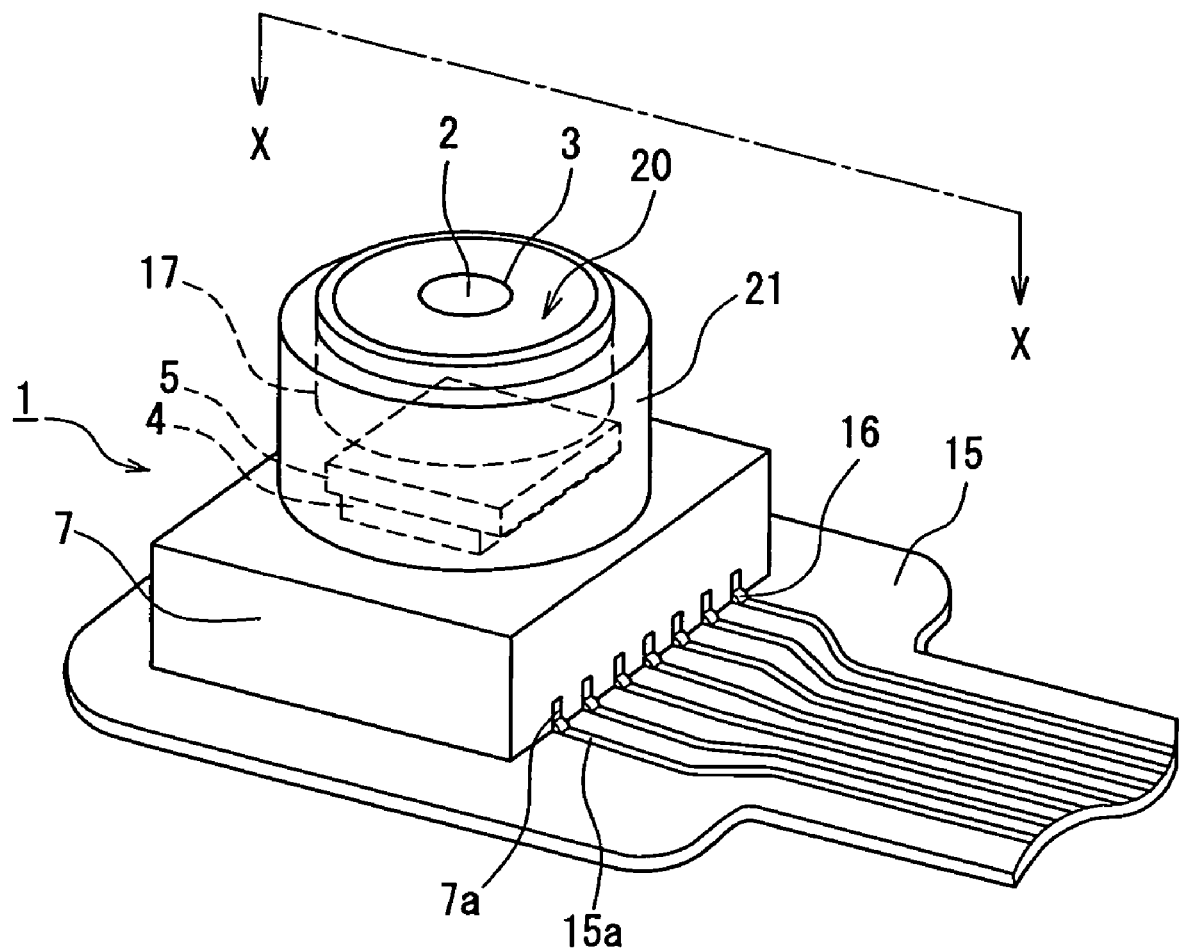
FIG. 1 is a perspective view of an imaging apparatus according to an embodiment of the present invention.
Figure 2:
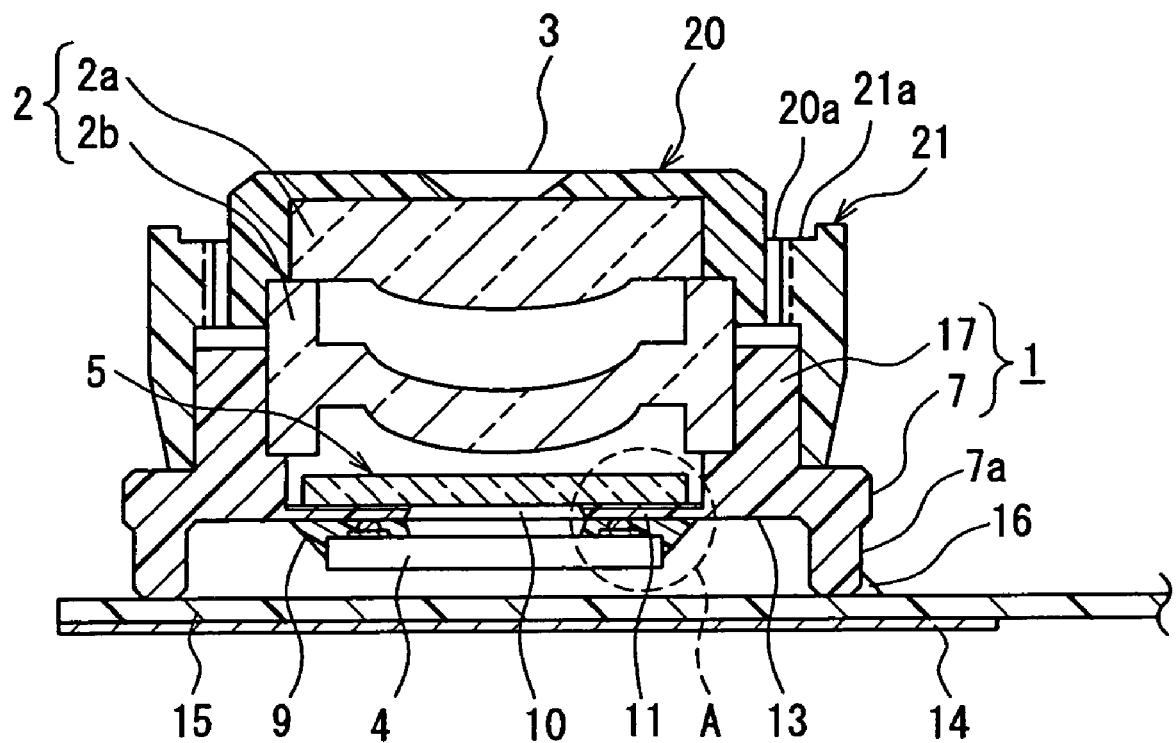
FIG. 2 is a cross-sectional view of the imaging apparatus along a line X-X of FIG. 1.
Figure 3:
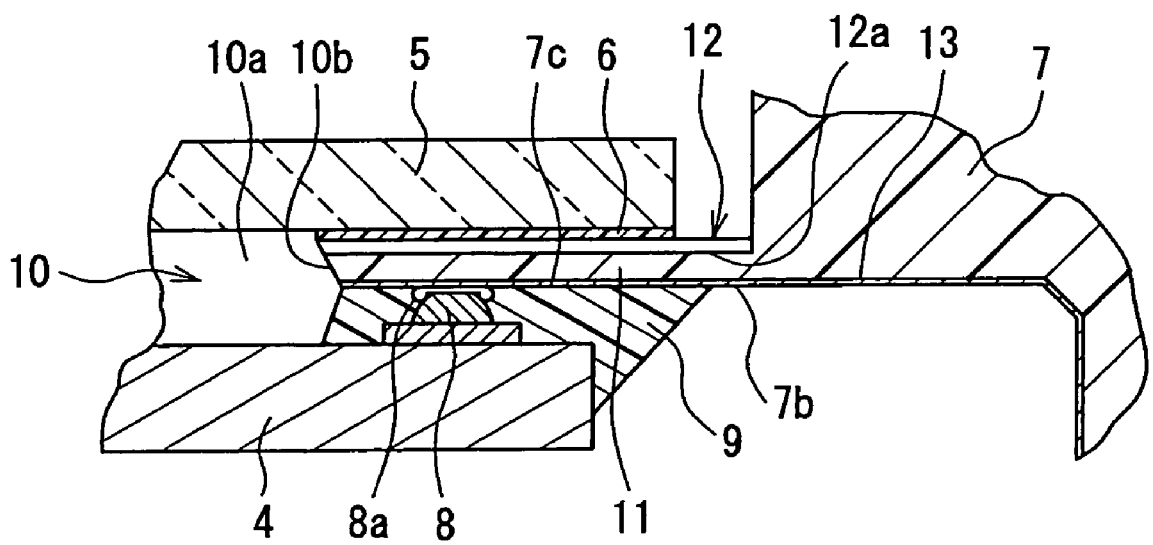
FIG. 3 is an enlarged view of a portion denoted A in FIG. 2.

Hereinafter, the present invention will be described by way of an embodiment with reference to the appended drawings. Referring first to FIGS. 1 to 3, the description is directed to the configuration of an imaging apparatus according to this embodiment.

FIG. 1 is a perspective view of the imaging apparatus. A three-dimensional substrate 1 is composed of a base part 7 having a rectangular planar shape and a cylindrical barrel part 17 provided on the base part 7. The three-dimensional substrate 1 is formed from a glass reinforced PPA (polyphthalamide resin) or the like and is tinted black so as to prevent the transmission of external light therethrough. For the connection to the exterior, a terminal part 7a is provided on an outer side of the base part 7 of the three-dimensional substrate 1. AFPC (flexible printed circuit board) 15 for transmitting signals to and receiving signals from external equipment is disposed on a lower side of the base part 7, and a connection land 15a formed on the FPC 15 is connected to the terminal part 7a using solder 16. A lens 2 that is made of resin and fitted into a lens holder 20 is disposed in an inner cavity of the barrel part 17 of the three-dimensional substrate 1. The lens holder 20 is fixed on an outer side of the barrel part 17 by means of an adjusting ring 21 disposed on an outer side of the lens holder 20. The lens holder 20 is provided with a diaphragm 3. A semiconductor imaging device 4 and an optical filter 5 that suppresses the sensitivity to light in the infrared region are disposed on a boundary between the base part 7 and the barrel part 17.

The following describes the structure of the imaging apparatus in further detail with reference to FIGS. 2 and 3. FIG. 2 is a cross-sectional view of the imaging apparatus shown in FIG. 1 taken on line X-X FIG. 3 is an enlarged view of a portion denoted A in FIG. 2. A partition wall 11 is formed on a boundary between the base part 7 and the barrel part 17. An opening 10a is formed at a central portion of the partition wall 11, and upper and lower surfaces of the partition wall 11 that enclose the opening 10a respectively form a first flat surface 12 and a second flat surface 13 that are parallel to each other. The optical filter 5 is disposed on the first flat surface 12 on an upper side, and the semiconductor imaging device 4 as well as a chip component and the like that are not shown is disposed on the second flat surface 13 on a lower side. The optical filter 5 is fixed in a predetermined position on the first flat surface 12 using an adhesive 6. The opening 10a is formed in a rectangular shape so as to correspond to an imaging area of the semiconductor imaging device 4 that will be described later. All of these constituent components are assembled on the three-dimensional substrate 1.

As shown in FIG. 3, a wiring pattern 7b is formed on a back side of the base part 7 by electroless plating or the like. On an inner side of the second flat surface 13 in the three-dimensional substrate 1, a connection land 7c for bare-chip mounting the semiconductor imaging device 4 is provided. The connection land 7c is connected to the terminal part 7a by means of the wiring pattern 7b.

The semiconductor imaging device 4 is formed of, for example, a so-called ⅙-inch VGA CCD with about 320,000 pixels and face-down mounted with respect to the connection land 7c so as to be connected electrically to the connection land 7c. This is intended to perform bare-chip mounting using no package, thereby realizing the thickness reduction of the imaging apparatus. Face-down mounting is performed by, for example, so-called SBB Stud Bump Bond) that is a c connection method using a bump 8 formed from gold and an Ag paste 8a that is a conductive adhesive containing silver as a conductive material and applied on the tip of the bump 8. The semiconductor imaging device 4, after being face-down mounted, is sealed with a sealant 9. An electric wiring is formed via the wiring pattern 7b and the connection land 15a of the FPC 15 (see FIG. 1), and used for the output of image signals to the exterior, which are obtained by the semiconductor imaging device 4 and the chip component and the like that are not shown, a control signal from the exterior, and power supply. Metal foil 14 (see FIG. 2) is attached on a back surface of the FPC 15 so as to prevent the entry of visible light and infrared light from the back surface into the semiconductor imaging device 4.

On the first flat surface 12 of the opening 10a provided in the three-dimensional substrate 1, on which the optical filter 5 is installed, an air passage 12a having a labyrinth structure is formed at a position axisymmetric with respect to the opening 10a. After the optical filter 5 and the semiconductor imaging device 4 are installed, the opening 10a constitutes a cavity 10, and air travels between the cavity 10 and the exterior only through the air passage 12a.

The lens 2 housed in the barrel part 17 is composed of two aspherical lenses (hereinafter, abbreviated as lenses) 2a and 2b that have different optical characteristics from each other and are fitted into the lens holder 20 in such a manner that constant positional relationship between them can be maintained. On an outer periphery of the lens holder 20 and on an inner periphery of the adjusting ring 21 disposed on the outer side of the lens holder 20, screws 20a and 21a that engage with each other are formed, respectively, so that the position of the lens holder 20 in an axial direction can be adjusted.

The description is directed next to an optical system of the imaging apparatus according to this embodiment with the above-described configuration. Light from a subject passes through the diaphragm 3 provided at a center of the lens holder 20 to be focused by the lens 2, passes through the optical filter 5, and enters the semiconductor imaging element 4 to form an image. The diaphragm 3 is designed to have an aperture increasing in a direction toward the side of the subject. This is intended to prevent a phenomenon in which light entering toward the lens impinges on a wall surface in an optical axis direction of the diaphragm 3 to be diffused and enters the lens as unwanted light.

The lens 2 is formed from a resin that can satisfy required optical characteristics such as a transmittance, a refractive index and the like. This embodiment uses a lens as an example that is formed by injection molding using "ZEONEX" (trade name) manufactured by ZEON Corporation. For example, the lens 2 is composed of two lenses and achieves a so-called pan-focus that allows an image to be formed at a distance farther than a given distance. In this embodiment, for example, the lens 2 is set so that focus is achieved with respect to a subject at a distance farther than a distance of about 30 cm. These configurations and characteristics can be selected suitably.

The optical filter 5 suppresses the transmission of light in a region other than the visible light region. In this embodiment, for example, borosilicate glass is used as a base material so that ultraviolet light is cut off. A filter that has one surface coated with an IR (Infra Red) cut-off coat and the other surface coated with an AR (Anti Reflection) coat for preventing reflection can be used. The optical filter 5 according to this embodiment has spectral characteristics shown in FIG. 4B, for example. The optical filter 5 is set to have a transmittance of approximately 93% or higher with respect to light with a wavelength in a visible light region of about 400 nm to 600 nm and a sufficiently low transmittance with respect to light with a wavelength in a region other than the visible light region. The spectral characteristics also can be changed suitably. As the IR cut-off coat, for example, a film of silicon dioxide ($SiO_2$), titanium oxide ($TiO_2$) or the like is formed on glass by vapor deposition. As the AR coat for preventing reflection, for example, a film of magnesium fluoride ($MgF_2$), titanium oxide ($TiO_2$), zirconium oxide ($ZrO_2$) or the like is formed by vapor deposition. With respect to each of the IR cut-off coat and the AR coat, a film configuration and the number of layers to be laminated can be selected suitably depending on characteristics of suppressing transmission/reflection of light in the visible light region and light in a region other than the visible light region.

The adhesive 6 for bonding the optical filter 5 is formed from, for example, a UV thermosetting adhesive that uses an epoxy resin as a base material. It is desirable to select a material for the adhesive 6 that has a coefficient of linear expansion in a range between the coefficient of linear expansion of the three-dimensional substrate 1 and the coefficient of linear expansion of the optical filter 5. This is intended to reduce stress to be exerted on the three-dimensional substrate 1 and the optical filter 5 at the time of heating, which is performed generally in a bonding/curing process, thereby preventing a deterioration of, for example, the flatness with respect to a mounting surface due to warping or the like. In this embodiment, for example, the three-dimensional substrate 1 has a coefficient of linear expansion of approximately $40 \times 10^{-6}$ mm/mm° C., and the optical filter 5 has a coefficient of linear expansion of about $10 \times 10^{-6}$ mm/mm° C. The adhesive 6 of an epoxy resin for fixing these components is adjusted to have a coefficient of linear expansion in the range between these coefficient values through adjustment of the content of a filler (not shown).

An infrared light component and an ultraviolet light component of light from a subject are cut off/absorbed by the optical filter 5, and thus only a visible light component of the light enters the semiconductor imagining device 4. The incident light component passes through known so-called micro lenses or on-chip lenses provided on a surface of a light-receiving surface of the semiconductor imaging device 4, which are not shown, passes through a color filter that is a color system provided below the lenses, and is converted into the required electric signal by a photodiode. As a result, for example, an image signal in a frame rate of 30 frames per second with an aspect ratio of a screen of 4:3 is output.

As described above, the semiconductor imaging device 4 is face-down mounted in the form of a bare chip using no package so that the imaging apparatus has a reduced thickness. Moreover, the semiconductor imaging device 4 itself further is ground from a back surface side so as to have a thickness reduced to about 0.7 mm. As is apparent also from FIG. 2, the thickness of the imaging apparatus can be reduced as much as the thickness of the semiconductor imaging device 4 is reduced. Therefore, it is highly effective in reducing the thickness of an imaging apparatus to use a wafer having a reduced thickness. In view of the fact that a color filter, an aluminum wiring, a photodiode and the like that are provided on a lower side of micro lenses have a thickness of at most about several tens of microns, a wafer having a further reduced thickness can be used. However, it is desirable that the thickness of a wafer be determined suitably taking into consideration the magnitude of an external force exerted due to, for example, mounting equipment or the like being handled and the respective parameters of the flatness, mechanical strength and the like of the wafer itself. In addition, in the case where the semiconductor imaging device 4 is reduced in thickness, deterioration of an image may be caused particularly by light with a long wavelength that enters from a back surface, and thus it is desirable that, as in this embodiment, measures should be taken to prevent such a deterioration by, for example, shielding the back surface from light with the metal foil 14 or the like.

An end surface 10b facing the opening 10a is configured so that an area of the opening is increased toward the side of the semiconductor imaging device 4. Similarly to the above-described diaphragm 3, this is intended to prevent a phenomenon in which light that has impinged on the end surface 10b of the opening is diffused and enters the lens again as unwanted light. Although it also is possible to prevent this phenomenon by roughening the end surface or applying a matte coating for preventing reflection on the end surface, with the configuration according to this embodiment, it is only required to provide a needed taper on a mold for forming the three-dimensional substrate 1 made of resin by injection molding, thus eliminating the need to roughen the end surface or apply the matte coating. In the injection molding, this tapered portion can be utilized as a releasing taper, and thus the above-described configuration further is effective in obtaining excellent moldability and mold releasability at the time of molding. The imaging apparatus according to this embodiment is manufactured by processes in which the optical filter 5 and the semiconductor imaging device 4 are mounted on the three-dimensional substrate 1 so as to be formed into a module, and then the optical system is fabricated. It is desirable that the above-described fabrication be performed in an environment with high cleanliness.

Figure 4A:
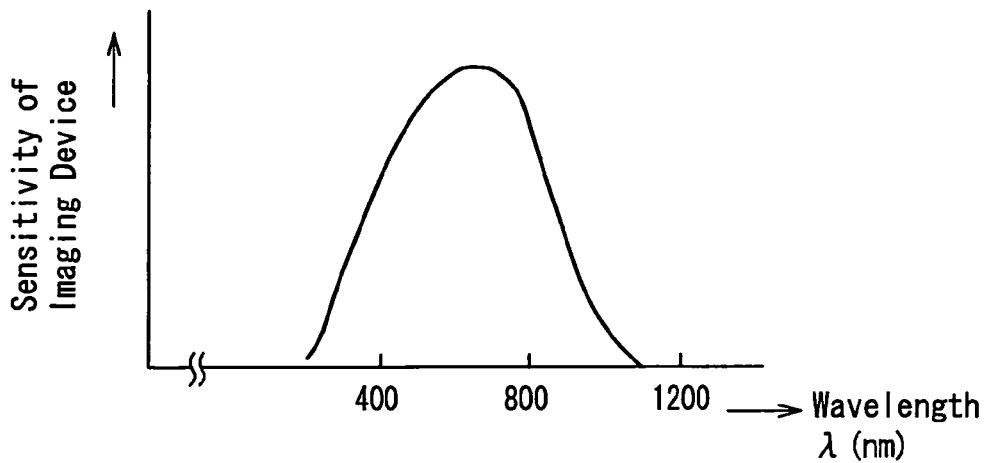
FIG. 4A is a diagram showing characteristics of the imaging apparatus according to the embodiment of the present invention with respect to light wavelengths, specifically, the sensitivity of a semiconductor imaging device with respect to light wavelengths.

The description is directed next to the light transmittance in the three-dimensional substrate 1 with reference to FIG. 4. FIG. 4A shows the sensitivity of the semiconductor imaging device 4 with respect to wavelengths in this embodiment. The semiconductor imaging device 4 according to this embodiment is formed from silicon, and an upper limit value on a long wavelength side in a sensitivity region of the semiconductor imaging device 4 is determined by a wavelength defined by the band gap energy (Eg) of silicon. Silicon generally has a band gap energy of about 1.12 eV at room temperature. Further, it is known that a limit value of a wavelength can be determined by $\lambda \approx 1,240/Eg$, and thus a limit value on a long wavelength side of about 1,100 nm is obtained. On the other hand, the sensitivity on a short wavelength side extends to a value as short as about 200 nm in the ultraviolet region.

Figure 4B:
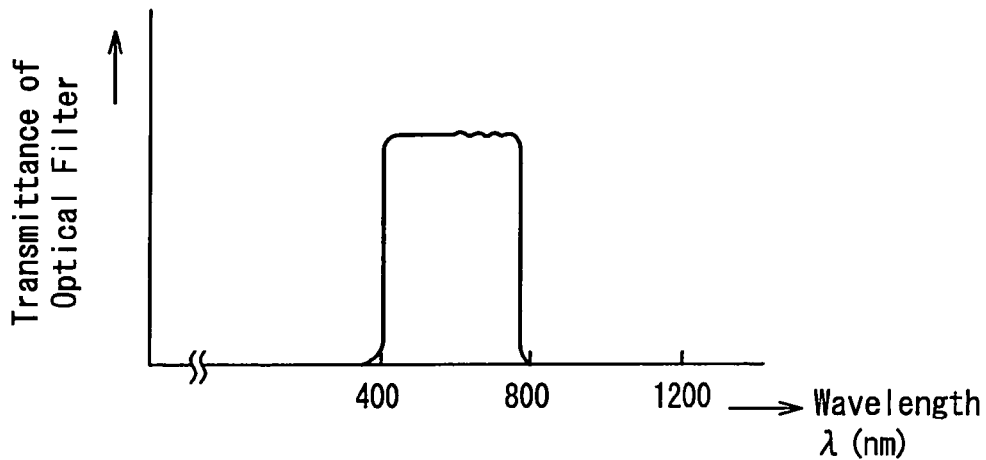
FIG. 4B is a diagram showing the transmittance of an optical filter with respect to light wavelengths.

FIG. 4B shows the transmittance of the optical filter 5 with respect to wavelengths. The optical filter 5 is formed from borosilicate lead glass as a base material and thus is provided with a characteristic of absorbing light in the ultraviolet region. With respect to a long wavelength side, the transmission of light in the infrared region is suppressed by the above-described IR cut-off coat. These two characteristics allow only the transmittance of light in the visible region to be increased.

Figure 4C:
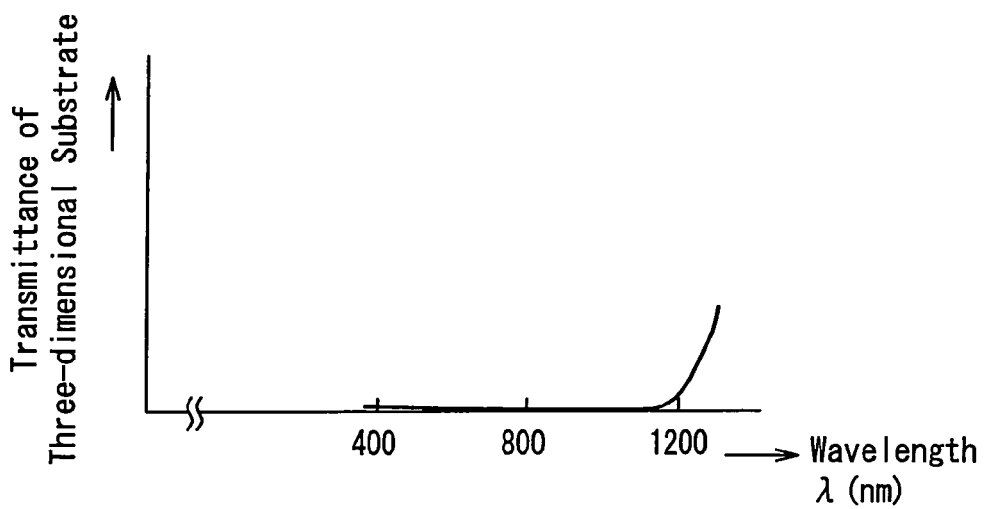
FIG. 4C is a diagram showing the transmittance of a three-dimensional substrate with respect to light wavelengths.

FIG. 4C shows the transmittance of the three-dimensional substrate 1 with respect to wavelengths. The three-dimensional substrate 1 is set to have a light transmittance that is sufficiently low with respect to a sensitivity region of the semiconductor imaging device 4. Specifically, carbon black and glass fiber are added to the resin material (PPA) of the three-dimensional substrate 1. Carbon black is effective with respect to visible light and light on a short wavelength side and has excellent dispersibility. Further, with respect to light on a wavelength side longer than a wavelength of visible light, in order to control the light transmittance, a slight amount of a metal filler that has a high thermal conductivity is used or a resin material of an increased thickness is used for the three-dimensional substrate 1. These methods of controlling the transmittance can be selected suitably depending on the degree of an influence on an image.

In the above-described manner, the light transmittance of the three-dimensional substrate 1 is adjusted so as to be low with respect to a region sensitive to light reception by the semiconductor imaging device 4. Thus, even in the case where the imaging apparatus is mounted in portable equipment or the like and thus possibly is used outdoors frequently, deterioration of an image caused by light entering from the periphery can be prevented reliably. Moreover, even in the case where the imaging apparatus is used in so-called skeleton type portable equipment, which is future portable equipment that itself has a translucent housing, the entry of light entering from the periphery can be prevented reliably, making it possible to prevent a deterioration of an image with reliability.

Figure 5:
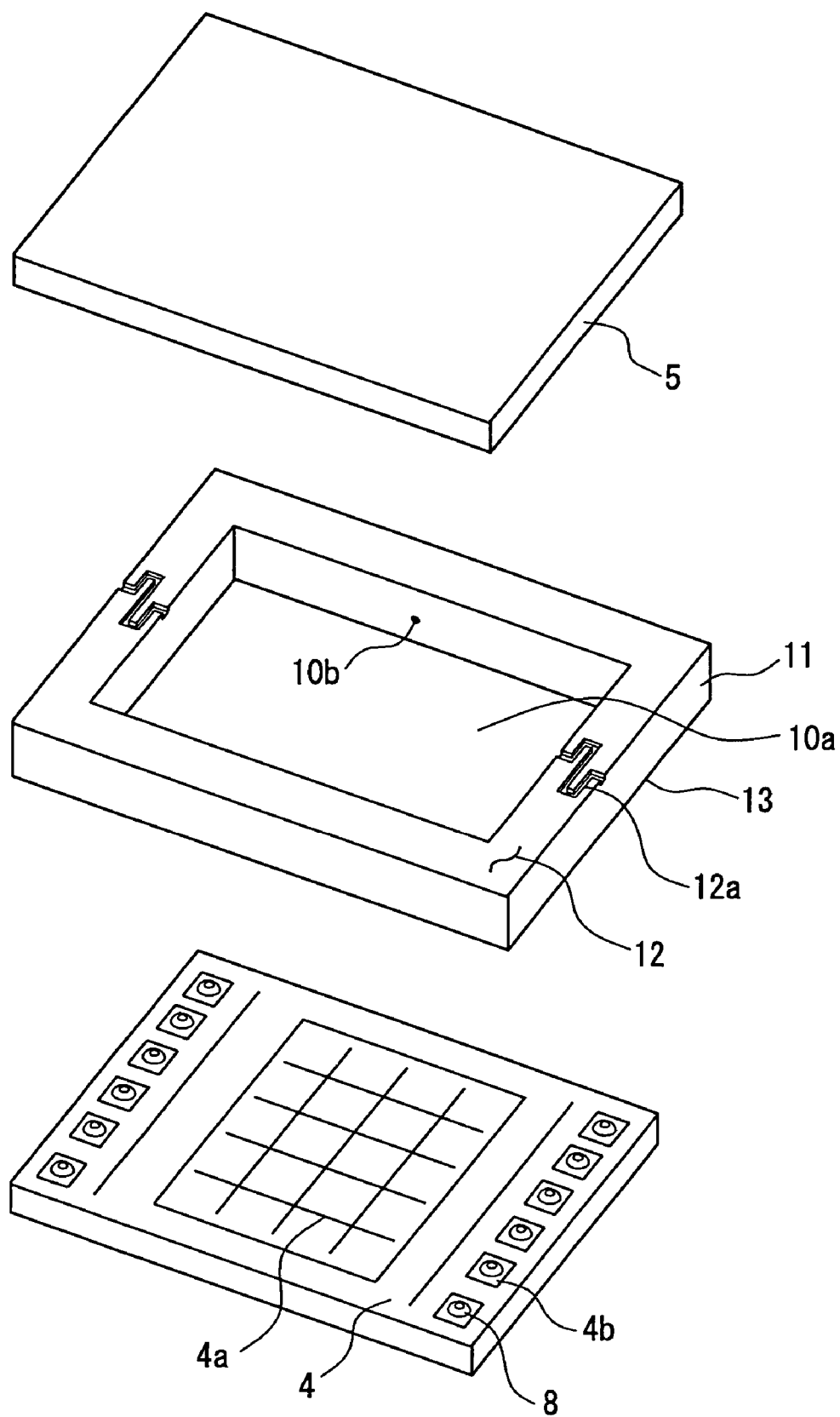
FIG. 5 is an exploded perspective view of an important portion showing the relationships among the optical filter, the three-dimensional substrate and the semiconductor imaging device in the embodiment of the present invention.

Next, the air passage having the labyrinth structure will be described in detail with reference to FIG. 5. FIG. 5 is an exploded perspective view of an important portion showing the relationships among the optical filter 5, the three-dimensional substrate 1 and the semiconductor imaging device 4. Although the partition wall 11 is shown to have a rectangular shape for the sake of convenience, a peripheral portion of the partition wall 11 actually is continuous to the other portion of the three-dimensional substrate 1. On the first flat surface 12 of the partition wall 11 that is positioned on a boundary between the base part 7 and the barrel part 17 of the three-dimensional substrate 1 and forms the opening 10*a*, the air passages 12*a* having the labyrinth structure are provided at a position axisymmetric with respect to the opening 10*a*. An amount of an airflow that passes through the labyrinth structure varies depending on a location in the labyrinth structure. Based on Bernoulli's theorem, a variation in the amount of airflow causes a variation in pressure, so that foreign matter is trapped while traveling. This embodiment makes positive use of this phenomenon. The labyrinth structure according to this embodiment has a zigzag shape. A groove of the labyrinth structure has a width of 0.13 mm and a depth of 0.04 mm. One end of the groove reaches the opening 10*a* and the other end extends beyond an outer periphery of the optical filter 5 installed on the first flat surface 12. It is desirable that the other end of the groove be positioned in such a manner as to allow an enough margin with respect to a deviation of a position of the installed optical filter 5.

In the semiconductor imaging device 4, an electric signal of an image obtained from an imaging area 4*a* in which effective pixels are arranged is led out to a Pad part 4*b* disposed on a periphery by means of an internal wiring formed from aluminum or the like, which is not shown. On the Pad part 4*b*, a gold wire formed into a required shape is provided as the bump 8 by a bump bonder. The bump 8 is used to establish an electrical connection between the three-dimensional substrate 1 and the connection land 7*c*. Although it also should be noted that the bump have an optimum shape according to the flatness of the second flat surface 13 and a joining method, detailed description thereof is omitted.

The air passage 12*a* has a zigzag shape and thus is set so that a flow rate of air passing therethrough varies depending on a location in the air passage 12*a*. Based on Bernoulli's principle, a variation in the flow rate causes a variation in pressure. Due to this variation in pressure, foreign matter being entrained in air flowing in/out is captured in the air passage 12*a*. As described above, in a module fabricated in an environment with high cleanliness, the cavity 10 formed as a result of enclosing the opening 10*a* is assumed to be free from foreign matter. Air in the opening 10 may flow in/out depending on temperature and pressure differences from those of ambient air. However, since foreign matter contained in the air flowing in is captured by the air passage 12*a*, the cavity 10 always is kept in a state of being free from foreign matter.

As described above, in fabricating an imaging apparatus, before fabricating an optical system, the optical filter 5 and the semiconductor imaging device 4 are installed on the three-dimensional substrate 1. A bonding or sealing process in this fabrication includes heating/cooling an entire module, which causes expansion/contraction of air in the cavity 10. If the air in the cavity 10 does not flow in from and out to the exterior, an internal pressure increases to cause a sealant to be pushed away, so that sealing at a predetermined position may be hindered in the fabrication of the module, and moreover, an increase in the internal pressure also may cause the optical filter 5 to be broken, which have been disadvantageous. In order to avoid this, in a known conventional method, an air purging hole is provided However, this method requires an operation of dosing the hole at a later stage, and foreign matter generated by a material used to dose the hole or foreign matter produced in the dosing operation may enter the cavity 10, which has been disadvantageous. Further, in curing equipment used for curing a sealant or an adhesive, although full attention is paid to keeping the cleanliness of the environment, due to dust generated when the sealant or the adhesive is cured, foreign matter is likely to be present compared with other dean environments, and thus cleanliness tends be lowered. Under this environment, when air in the cavity 10 expands and then contracts, surrounding air is taken into the cavity. Against such air movement, the provision of an air passage can prevent the entry of foreign matter reliably. This can prevent reliably the adherence of foreign matter to the surface of the semiconductor imaging device 4, which is most likely to have an influence on image quality, thereby allowing a more reliable imaging apparatus to be obtained.

It is known that an image is influenced most by foreign matter that adheres to the above-described micro lenses provided on the surface of the semiconductor imaging device 4. This is because such foreign matter blocks light from being incident on the photodiode of the semiconductor imaging device 4, and thus directly causing an output decrease. Further, foreign matter of a size equivalent to a pixel size surely affects an image as a flaw, and thus exerting a particularly large influence.

An examination of the influence of foreign matter on an image in this embodiment was performed and found that, with respect to foreign matter of almost the same size, an influence exerted by foreign matter that was present on the surface of the semiconductor imaging device 4 was as large as about 40 times an influence exerted by foreign matter on an upper surface of the optical filter 5 (surface on a lens side). Although the degree of an influence may vary depending on conditions of the optical system, this explains how largely an image could be influenced by foreign matter that adheres to the surface of the semiconductor imaging device 4. Since there is a possibility that foreign matter that is present in the cavity 10 adheres to the surface of the semiconductor imaging device 4, it is extremely important that the entry of foreign matter into the cavity 10 is prevented.

With an increasing demand for smaller imaging apparatuses with higher quality, it also has become necessary that the semiconductor imaging device 4 is bare-chip mounted. Therefore, in order to achieve thickness reduction without deteriorating reliability, it is effective that foreign matter entrained in air flowing in/out of the cavity 10 is captured by the air passage 12*a* having the labyrinth structure.

Figure 6A:
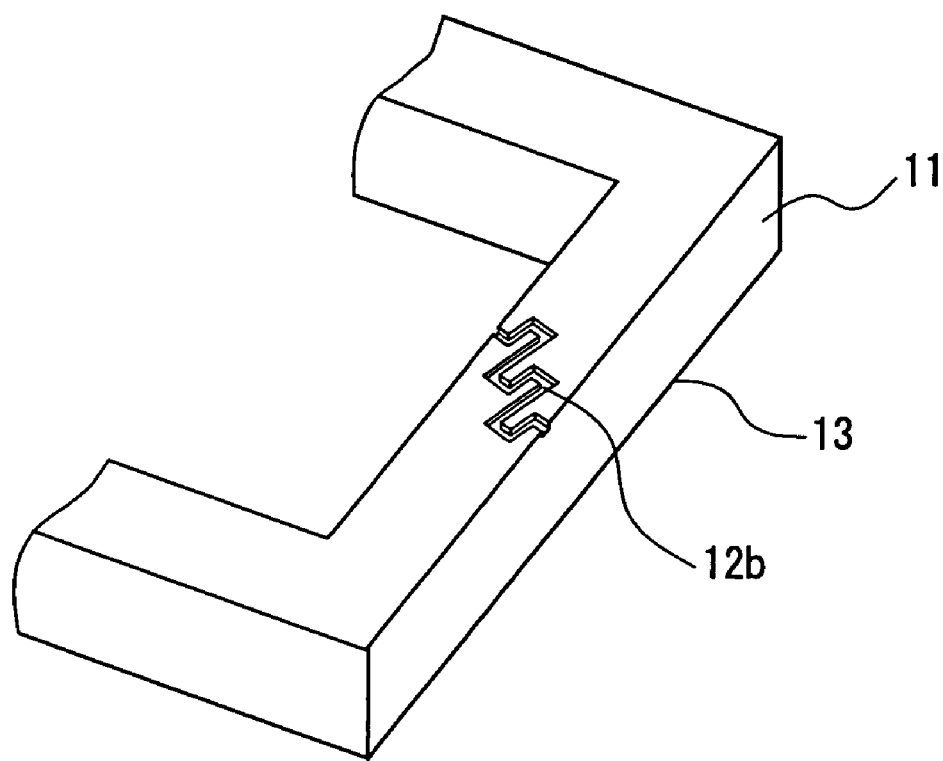
FIGS. 6A to 6F are perspective views respectively showing other examples of the shape of an air passage provided on a partition wall according to the embodiment of the present invention.
Figure 6B:
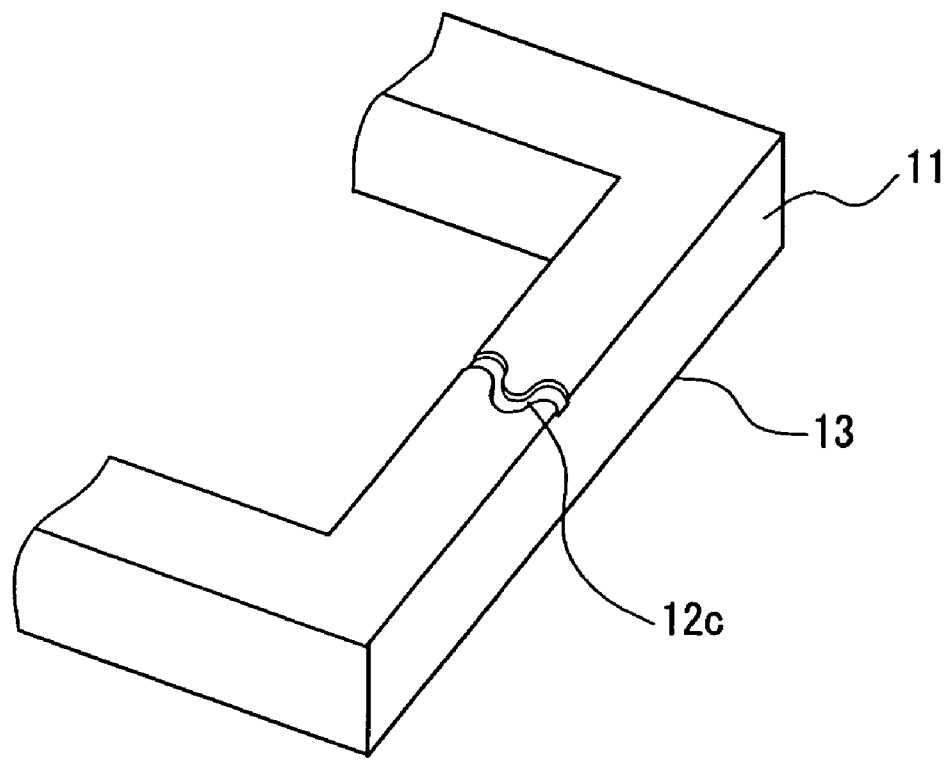

The labyrinth structure of the air passage 12*a* according to this embodiment has a zigzag shape extending linearly from a center of the opening 10 to an outer side. However, the labyrinth structure may have a shape inclined as a whole such as of an air passage 12*b* shown in FIG. 6A or a circular-arc shape such as of an air passage 12*c* shown in FIG. 6B. Further, the groove of the labyrinth structure may have a width and a depth that vary depending on a location in the labyrinth structure. Also in these cases, in order not to incur a cost increase, it is preferable that the air passage 12*a* is shaped using a mold for forming the three-dimensional substrate 1 by resin molding. As described above, the labyrinth structure according to this embodiment can be defined as a structure in which the air passage 12*a* has a planar shape such that a flow rate of air passing through the air passage 12*a* varies depending on a location in the air passage 12*a*.

With the air passages 12*a* provided at a position axisymmetric with respect to the opening 10*a*, stress generated due to, for example, thermal stress exerted when the optical filter 5 is fixed on the first flat surface 12 by bonding can be adjusted so as to be balanced with respect to the opening 10*a*. Thus, a deterioration of the flatness of the second flat surface 13 for mounting the semiconductor imaging device 4 can be prevented reliably. Generally, in the case where the semiconductor imaging device 4 is face-down mounted on the second flat surface 13 by a connection method such as BGA (Ball Grid array) or SBB, the flatness of a portion used for connection should be suppressed to about half the height of the bump 8, and it is desirable that the flatness be not more than about 30 µm. Therefore, it is necessary to minimize factors that deteriorate the flatness of the second flat surface 13.

Figure 6C:
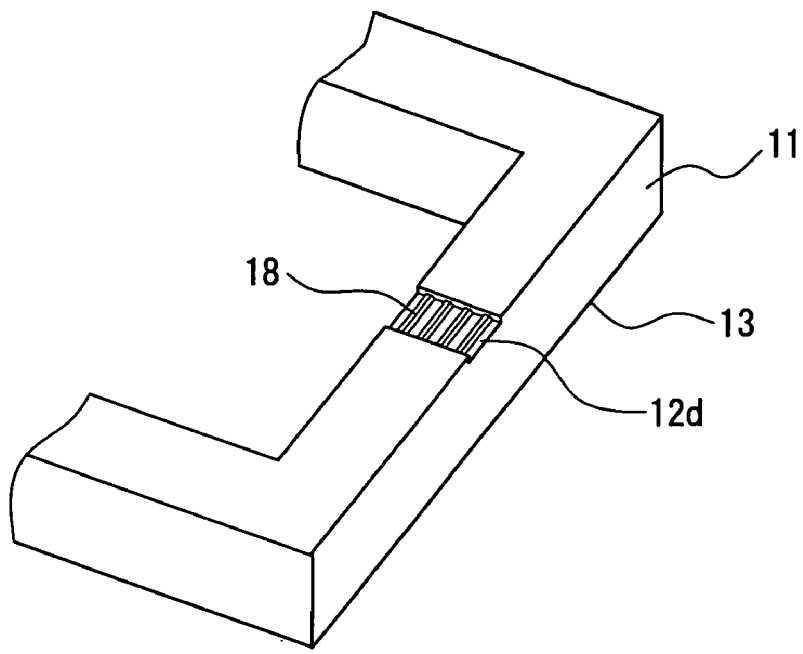
Figure 6D:
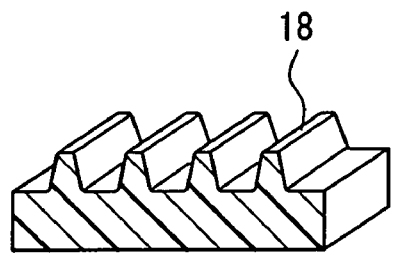

The description is directed next to a labyrinth structure of an air passage according to another embodiment with reference to FIGS. 6C to 6F. An air passage 12d shown in FIG. 6C is provided with ribs 18. Since the ribs 18 are present, the height of the air passage 12d with respect to a thickness direction of the optical filter 5 varies along a flow path. FIG. 6D shows an enlarged view of the ribs 18. According to this structure, a gap formed between the optical filter 5 and the labyrinth structure varies in cross-sectional area along the air passage 12d. This can cause a flow rate of air passing through the air passage 12d to vary with the height of the gap.

The gap formed between an upper surface of the ribs 18 and the optical filter 5 has, for example, a minimum size of 30 µm and a width of 0.4 mm. These dimensions can be selected suitably according to characteristics of a semiconductor imaging device, a pixel size, manufacturing conditions used in processes and the like. Moreover, the ribs 18 have a shape tapered toward a tip portion. This shape is employed in consideration of the following. That is, when forming the three-dimensional substrate 1 by injection molding, this shape can be obtained using a so-called impression formed in a mold. Further, this shape provides the effect of allowing a releasing taper to be formed so as to improve mold releasability.

Figure 6E:
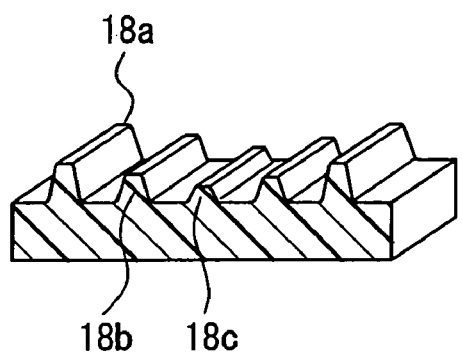

FIG. 6E shows an embodiment in which the ribs 18 shown in FIG. 6D is modified. A labyrinth structure in this case has ribs 18a to 18c. The ribs 18a to 18c have a height decreased in this order. According to this structure, the ribs 18a to 18c have a height varying depending on a position in a flow direction of an air passage. This can cause a flow rate to vary in a larger degree, and thus foreign matter is captured more effectively. The order of arrangement of the respective heights of the ribs 18a to 18c can be changed suitably. Further, it is preferable that, similarly to the ribs 18 shown in FIG. 6D, the ribs 18a to 18c have a shape that can be obtained using a so-called impression formed in a mold and provides the effect of allowing a releasing taper to be formed so as to improve mold releasability.

Figure 6F:
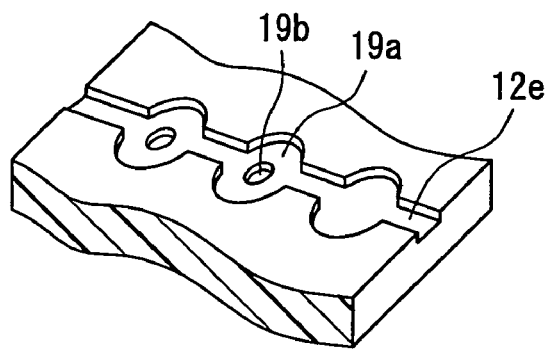

In a labyrinth structure of an air passage 12e shown in FIG. 6F, a concave part 19a is formed on a side edge of the air passage 12e in the first flat surface 12. With the concave part 19a, while the height of the air passage 12e does not vary with respect to the thickness direction of the optical filter 5, the width of the air passage 12e varies along a flow direction. This allows a gap formed between the optical filter 5 and the labyrinth structure to vary in the area of a cross section orthogonal to a direction of an airflow. According to this configuration, a flow rate of air passing through the air passage 12e varies with a cross-sectional area, and thus foreign matter is captured. In a position of the concave part 19a, a deeper concave part 19b may be provided so that foreign matter that has been captured is captured securely by the deep concave part 19b.

The concave part 19a has a depth of, for example, 50 µm, and the width of the air passage 12e is, for example, 0.4 mm at the widest point and a 0.15 mm at the narrowest point. Moreover, the deep concave 19b has a cylinder shape that is, for example, 0.15 mm in depth and 0.15 mm in diameter. These dimensions can be selected suitably according to characteristics of a semiconductor imaging device, a pixel size, manufacturing conditions used in processes and the like.

Figure 7:
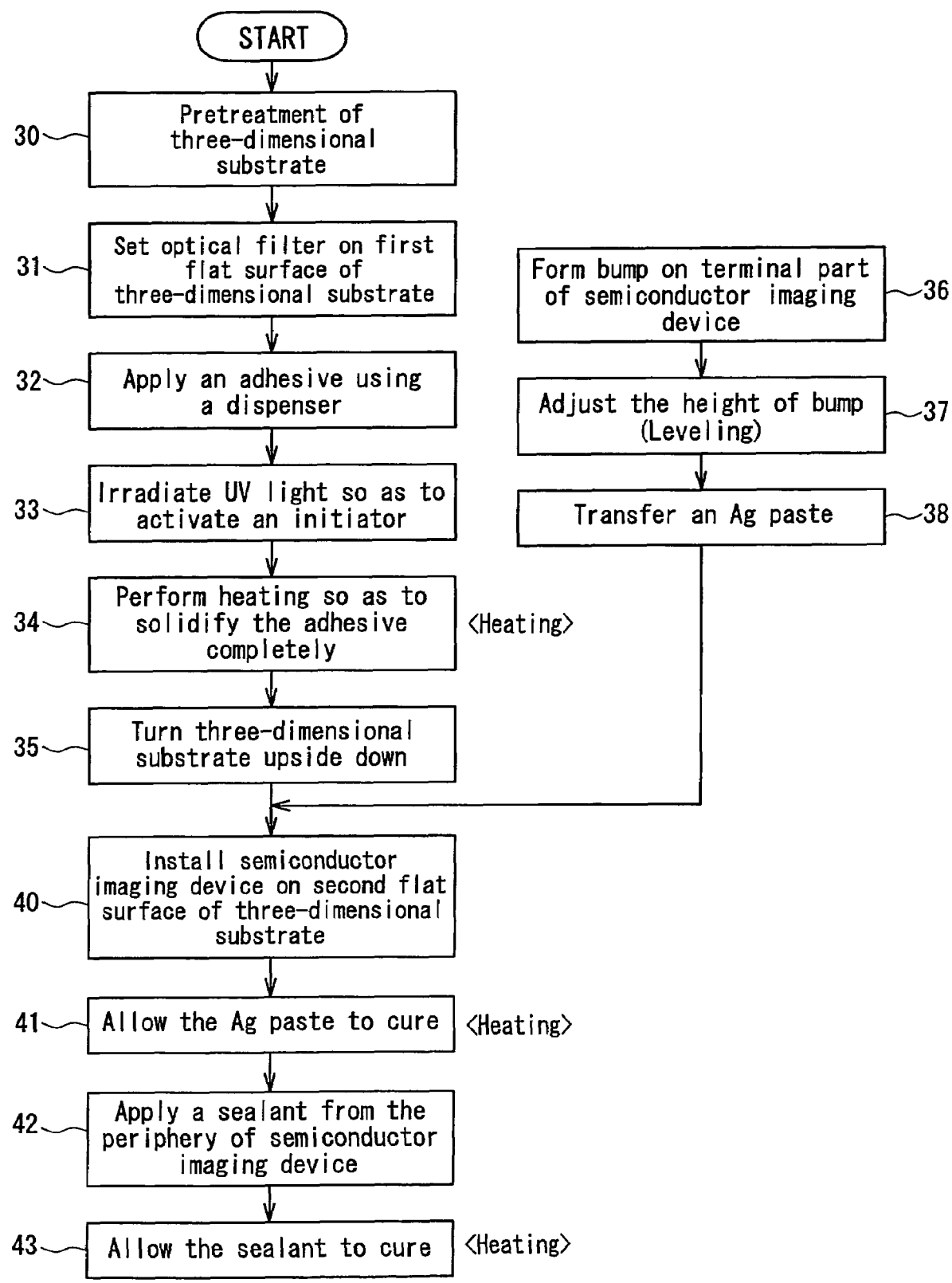
FIG. 7 is a diagram showing a flow of fabricating the imaging apparatus according to the embodiment of the present invention.

It also is possible to use the labyrinth structures according to the above-described embodiments in combination so as to allow greater design freedom. For example, the ribs 18 shown in FIG. 6D may be arranged in a portion of the concave part 19a in the labyrinth structure shown in FIG. 6F so that a variation in height is obtained The description is directed next to a method for manufacturing the imaging apparatus according to this embodiment with reference to FIG. 7 and FIGS. 1 to 3. FIG. 7 is a diagram showing a flow of fabricating an important portion of the module prior to the installation of the optical system, in which the semiconductor imaging device 4 is mounted on the three-dimensional substrate 1 as described above. In the figure, process steps that are not related directly to this embodiment are omitted. Step S30 to S35 are process steps up to the fabrication of the optical filter 5 on the three-dimensional substrate 1. Steps S36 to S38 are process steps in which the semiconductor imaging device 4 is prepared to be mounted on the three-dimensional substrate 1. Steps S40 to S43 are process steps from a step of finishing mounting with respect to the three-dimensional substrate 1 to a step of completing the module.

First, in a pretreatment performed in Step S30, the three-dimensional substrate is subjected to baking and cleaning so that moisture contained in a slight amount in the three-dimensional substrate is eliminated. It is preferable that, particularly, conditions for eliminating moisture are determined based on an evaluation of a final product, though they also may depend on heating conditions. Next, in Step S31, the optical filter 5 that has been cleaned is placed in a desired position on the first flat surface 12 of the three-dimensional substrate 1. At this time, as well as positioning of the optical filter 5, a front or back of the optical filter 5 is checked as necessary. Next, in Step 32, a fixed amount of the adhesive 6 made of a UV thermosetting epoxy resin for fixing the optical filter 5 to the three-dimensional substrate 1 is applied using a dispenser. Next, in Step 33, the adhesive 6 is irradiated with UV light. This allows a cure initiator contained in the adhesive to be activated to start curing. Next, in Step S34, heating is performed at 150° C. so that the curing of the adhesive 6 that has been initiated using the UV light is performed completely. Thus, the optical filter 5 is fixed at the desired position of the three-dimensional substrate 1. Next, in Step S35, the three-dimensional substrate 1 on which the optical filter 5 is fixed is turned upside down and set in equipment for mounting the semiconductor imaging device 4.

The following describes the process steps in which the semiconductor imaging device 4 is prepared for mounting. In Step S36, the bump 8 for connection is bonded to the Pad part 4b of a bare chip that is formed by dicing of a wafer and constitutes the semiconductor imaging device 4. To this end, a gold wire is heated and discharged from a nozzle referred to as a capillary so as to form the bump 8. Next, in Step S37, a tip portion of the bump 8 is deformed plastically so that the bump 8 is adjusted to have a predetermined height. Next, in Step 38, as a conductive adhesive for electrically connecting the bump 8 and the connection land 7c of the three-dimensional substrate 1, an Ag paste is transferred onto the tip portion of the bump 8. Since connection reliability may be affected by the shape of the tip portion of the bump 8, the viscosity and conductivity the Ag paste, and the like, it is desirable that full consideration be given in setting conditions.

The following describes the process steps from a step of mounting the semiconductor imaging element 4 to the step of completing the module. In Step S40, using a pattern recognizer or the like, positioning is performed so that the semiconductor imaging device 4 and the connection land 7c of the three-dimensional substrate 1 are aligned with respect to each other, and the semiconductor imaging device 4 is placed on the second flat surface 13 of the three-dimensional substrate 1. Next, in Step 41, the Ag paste on the tip portion of the bump 8 provided on the semiconductor imaging device 4 is cured by heating at 80° C. Next, in Step S42, a sealant for shielding the semiconductor imaging device 4 from ambient air is applied. Next, in Step 43, the sealant is cured by heating at 125° C. Temperature conditions for these process steps can be selected suitably depending on an adhesive, equipment and the like that are used.

According to the above-described process steps, the optical filter 5 is fixed with respect to the three-dimensional substrate 1, and thus the mechanical strength of the three-dimensional substrate 1 can be increased. With an increase in the mechanical strength, high accuracy of the flatness of the second flat surface 13 for mounting the semiconductor imaging device 4 can be maintained. In other words, with a configuration in which the optical filter 5 is fixed so that the three-dimensional substrate 1 has a mechanical strength equal to that in the conventional case, the three-dimensional substrate 1 further can be reduced in thickness, thereby enhancing the thickness reduction of the imaging apparatus.

Furthermore, in heating processes performed in Steps S41 to 43, air in the cavity 10 expands/contracts. According to this embodiment, the air in the cavity 10 can flow in and out by means of the air passage 12a. Therefore, an internal pressure of the cavity 10 does not increase, and thus a phenomenon is avoided in which a sealant is pushed away, so that sealing at a predetermined position is hindered in the fabrication of the module and moreover, the optical filter 5 breaks. In addition, the air passage 12 having the labyrinth structure, while allowing air to flow in and out, prevents the entry of foreign matter reliably, and thus the adherence of the foreign matter to the surface of the semiconductor imaging device 4 can be prevented reliably. This facilitates the thickness reduction of imaging apparatuses.

INDUSTRIAL APPLICABILITY

The imaging apparatus according to the present invention can prevent the entry of foreign matter into a module in, for example, a process of fabricating the apparatus, facilitates the thickness reduction of the apparatus, and has a structure that improves workability in fabrication. Thus, the imaging apparatus can be used favorably in a camera mounted in portable equipment or the like.

The invention claimed is:

1. An imaging apparatus, comprising:
   a three-dimensional substrate in which a partition wall having an opening at a central portion is farmed so as to cross an inner cavity;
   an optical filter that is fixed on a first flat surface of both surfaces of the partition wall so as to cover the opening;
   a semiconductor imaging device that is face-down mounted on a second flat surface of the partition wall with an imaging area facing the opening; and
   an optical system for forming images that is installed on a side of the optical filter in the inner cavity of the three-dimensional substrate,
   the opening of the partition wall being closed on both sides with the optical filter and the semiconductor imaging device so as to form a cavity,
   wherein an air passage for allowing communication between the cavity and an exterior of the three-dimensional substrate is formed as a groove on the first flat surface, the groove having a labyrinth structure that causes a variation of a flow rate of air passing through the air passage depending on a location along the air passage.

2. The imaging apparatus according to claim 1, wherein the labyrinth structure of the air passage is defined by a zigzag shape, a shape inclined as a whole or a circular-arc shape.

3. The imaging apparatus according to claim 1, wherein the labyrinth structure of the air passage is formed by providing a rib crossing the air passage so that a height of the air passage in a thickness direction of the optical filter varies along a flow direction of the air passage.

4. The imaging apparatus according to claim 1, wherein the labyrinth structure of the air passage is formed by providing a concave part on a side edge of the air passage so that a width of the air passage within the first flat surface varies along the flow direction of the air passage.

5. The imaging apparatus according to claim 1, wherein the three-dimensional substrate has such a low light transmittance with respect to a region sensitive to light reception by the semiconductor imaging device that substantially no unwanted signal is generated.

6. The imaging apparatus according to claim 1, wherein the air passages are located at a position axisymmetric with respect to the opening in the three-dimensional substrate.

7. A method for manufacturing an imaging apparatus that uses a three-dimensional substrate in which a partition wall having an opening at a central portion is formed so as to cross an inner cavity, an air passage with a non-linear structure for allowing communication between the opening and an exterior of the three-dimensional substrate is formed on a first flat surface of both surfaces of the partition wall, and a conductor land for connection is provided on a second flat surface of the partition wall, comprising process steps of:
   fixing an optical filter on the first flat surface by bonding;
   installing a semiconductor imaging device with respect to the conductor land for connection provided on the second flat surface;
   sealing the semiconductor imaging device; and
   subsequently installing an optical system for forming images in the inner cavity of the three-dimensional substrates,
   wherein the air passage is formed as a groove having a labyrinth structure that causes a variation of a flow rate of air passing through the air passage depending on a location along the air passage.

* * * * *